United States Patent
Hughes

[11] 3,931,592
[45] Jan. 6, 1976

[54] SURFACE ACOUSTIC WAVE TUNED LASER

[75] Inventor: Richard Swart Hughes, China Lake, Calif.

[73] Assignee: The United States of America as represented by the Secretary of the Navy, Washington, D.C.

[22] Filed: June 14, 1974

[21] Appl. No.: 480,190

[52] U.S. Cl........ 331/94.5 C; 331/94.5 M; 350/161
[51] Int. Cl.² .......................................... H01S 3/10
[58] Field of Search..................... 331/94.5; 350/161

[56] References Cited
UNITED STATES PATENTS
3,633,995   1/1972   Lean et al..................... 331/94.5 C Primary Examiner—William L. Sikes
Attorney, Agent, or Firm—R. S. Sciascia; Roy Miller; Robert W. Adams

[57] ABSTRACT

Tuning a laser with a piezoelectric crystal having a reflective surface, wherein surface acoustic waves (SAW) deform the reflective surface of the crystal to create a diffraction grating.

6 Claims, 3 Drawing Figures

SURFACE ACOUSTIC WAVE TUNED LASER

BACKGROUND OF THE INVENTION

In the field of lasers, tunable lasers are gaining prominence because of their versatility and the applications to which they can be applied, such as, communications systems, radars, and range finders. Numerous tuning techniques have recently been developed, including those invented by the inventor of the present invention. None, however, have heretofore employed the surface acoustic wave phenomenon as a tuning technique.

SUMMARY OF THE INVENTION

The present invention is a method and apparatus for tuning a tunable laser wherein a crystal having a reflective coating is positioned in the laser cavity and acoustic waves are caused to occur on the crystal surface. Thus the laser beam is diffracted and the diffraction angle is determined by the frequency of the acoustic surface wave.

DESCRIPTION OF THE PREFERRED EMBODIMENT

Figure 1:
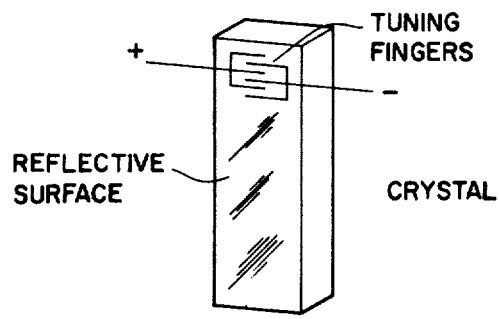
FIG. 1 is an elevational plan view showing a surface wave supporting crystal which may be employed in the preferred embodiment of the present invention.
Figure 2:
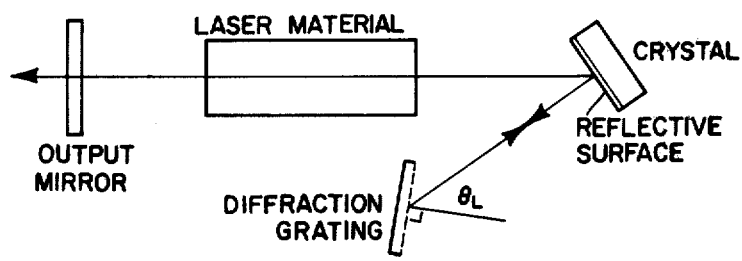
FIG. 2 is a plan view of a preferred embodiment of the present invention.
Figure 3:
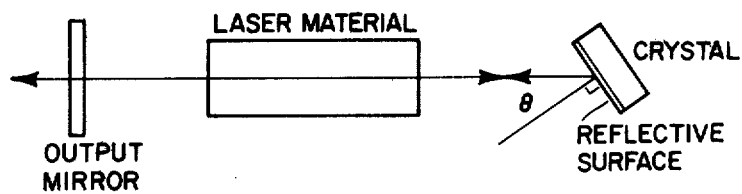
FIG. 3 is a plan view of an alternate preferred embodiment of the present invention.

FIG. 1 shows a descriptive, elevational view of the reflective crystal used in the exemplary embodiments of FIG. 2 and FIG. 3. The crystal is a piezoelectric crystal wherein a reflective material, such as aluminum, has been fixedly attached to, or embedded in, one surface of the crystalline material. As with prior surface acoustic wave devices, interdigital, tuning fingers, that are interlacing, non-contacting electrodes, are fixedly attached by, such as, microelectronic techniques near one end of the surface over which the waves are to be propagated. When a positive voltage is applied to one set of fingers, and a negative to the other, an acoustic wave having a half-wavelength equal to the spacing between adjacent fingers (or a wavelengh equal to the spacing between like-charged fingers), is propagated down the surface of the material. Since, in the present invention, the surface accommodating the waves has been coated with a reflective material, the surface and the reflective material are deformed by the moving wave, in a manner similar to ripples in the surface of a pond.

The surface acoustic waves (SAW) generated by the input to the tuning fingers, produce a periodic deformation in the crystal and, as a result the reflective surface, or mirror, becomes a phased grating for the laser beam. Thus, a means for deflecting a laser beam is provided and the deflection angle is determined by the frequency of the acoustic surface wave. The angular deflection Θ is given by:

$$\Theta_m = \sin^{-1}(m\lambda/\Omega)$$

Where:
$m$ is the diffraction order
$\lambda$ is the wavelength of the laser
$\Omega$ is the wavelength of the acoustic wave The resultant diffraction of light impinging on the reflective surface will be a function of the acoustic wave propagated in the surface, and ultimately a function of the signal applied to the tuning fingers.

FIG. 2 shows a plan view of one of the preferred embodiments of the present invention. The crystal, with its reflective surface, is placed near one end of the laser resonant cavity, in alignment with the laser beam. The laser material may be of any suitable lasing material, including suitable flourescent dyes presently being developed in the art. The present invention is intended to be applied to any tunable laser, including the organic dye variety. At the other end of the laser cavity is the output mirror which permits a percentage of the beam intensity impinged thereon to be transmitted and provided as the system output.

The beam impinging on the reflective surface of the crystal is directed by the surface toward the diffraction grating which acts as the fully reflective mirror to complete the resonant cavity. The diffraction grating is a tuning device providing retroreflection of a wavelength for each angle of incidence of the light impinging thereon. That is, because of the special characteristics of a diffraction grating, each frequency of light has a corresponding impingement angle at which it will be retroflectively reflected back along the path from which it came, and each angle of impingement has a corresponding frequency or narrow band of frequencies that will be retroflectively reflected. As a result, a portion of the beam is directed back into the cavity, and laser action is maintained, as the laser is tuned, without the necessity to reposition the components and redirect the reflections.

In the system of FIG. 2 the crystal deflector works in conjunction with the fixed diffraction grating to produce a high Q laser cavity for a very narrow specified band. The wavelength at which laser action can occur depends on the angle of incidence that the intracavity beam makes upon the fixed grating. This angle of incidence, and, hence, the laser wave length, is varied by varying the acoustic surface wave frequency, in the reflective surface of the crystal, which is controlled by the frequency of the input to the tuning fingers. The angular deflection change for small angles is given by:

$$\Delta(2\theta_d) = \frac{\lambda \Delta f}{v} \left[ \frac{1}{1 - \frac{f \lambda M}{2v \tan \theta_L}} \right]$$

Where:
$\lambda$ is the laser beam wavelength
$\Delta f$ is a change in acoustic frequency
$v$ is the acoustic wave velocity
$M$ is the angle magnification factor ($= 1$ for FIG. 2)
$\Theta_L$ is the angle of incidence upon fixed diffraction grating FIG. 3 shows a plan view of an alternate preferred embodiment of the present invention. In this embodiment the crystal occupies the position of the fully reflective mirror in conventional lasers, which with the laser material and output mirror complete the resonant cavity. In this configuration the acoustic surface waves which generate a reflection grating are used to provide a tunable retroreflection. The grating equation for the retroreflection case is:

$$m \lambda = 2d \sin \Theta$$

Where:
- $m$ is the diffraction order
- $\lambda$ is the wavelength of the laser
- $d$ is the acoustic wavelength = acoustic velocity/frequency
- $\Theta$ is the angle of incidence (is fixed for this application)

Thus, by changing the acoustic wavelength in the surface of the crystal, with the angle of incidence $\Theta$ maintained at a fixed value, the retroreflection wavelength $\lambda$ can be changed. Thus, one can sweep the acoustic wavelength, and, thereby, cause the laser output wavelength to be swept.

In both embodiments described the laser is tuned by the acoustical waves set up in the surface of the reflectively coated crystal, which are generated by the tuning fingers, attached to the crystal near one end of the reflective surface, in response to a selectable frequency, electrical input within a prescribed bandwidth. Tuning is accomplished by diffraction in accordance with the equation given above. The advantages of the present invention over prior devices and techniques include the employment of fewer components, and, as a result, is lower in cost, than other electronically tunable lasers.

What is claimed is:

1. A tunable laser, comprising:
   an optically resonant cavity bounded at one end by a partially reflective mirror through which is provided the output beam of said laser, including a source of laser light in said cavity; and
   tuning means in the optical path of said cavity for acousto-optically tuning the laser to oscillate at selected wavelengths in response to an electrical signal, comprising an electrical signal, a piezoelectric crystal in the optical path of said light opposite said partially reflective mirror from said source having at lease one reflective surface for reflecting said light, and interdigitized fingers on the reflective surface of said crystal for receiving said electrical signals and generating surface acoustic waves in said surface in response to said signals; wherein the laser is tuned at least in part by said surface acoustic waves.

2. The laser of claim 1 wherein the spacing of adjacent fingers of said interdigitized fingers is equal to a half-wavelength of the wavelength of said acoustic wave.

3. The laser of claim 2 wherein the reflective surface of said crystal acoustic waves cause said surface to act as a phased grating, deflecting said laser beam in accordance with, $$\theta_m = \sin^{-1}\left(m\frac{\lambda}{\Omega}\right)$$

wherein $\Theta$ is the angular deflection, $m$ is the diffraction order, $\lambda$ is the wavelength of the laser, and $\Omega$ is the wavelength of the acoustic wave.

4. The laser of claim 3 wherein the grating of said reflective surface of said crystal is retroreflective by said acoustic waves in accordance with $$m\lambda = 2d \sin\Theta$$

wherein $m$ is the diffraction order, $\lambda$ is the wavelength of the laser, $d$ is the acoustic wavelength, and $\Theta$ is the angle of incidence of the beam with the surface.

5. The laser of claim 3 wherein said cavity is bounded on the end opposite the partially reflective mirror by a reflective diffraction grating, and said reflective crystal surface is positioned in said cavity optically between said laser source and said diffraction grating.

6. The laser of claim 5 wherein the angular deflection change for small angles is given by:

$$\Delta(2\theta_d) = \frac{\lambda\Delta f}{v}\left[\frac{1}{1 - \frac{f\lambda}{2v\tan\theta_L}}\right]$$

wherein $\lambda$ is the wavelength of the laser, $\Delta f$ is the change in acoustic frequency by a change in said signal, $v$ is the velocity of the acoustic wave, and $\theta_L$ is the angle of incidence of the beam upon the diffraction grating.

* * * * *